Figure 1:
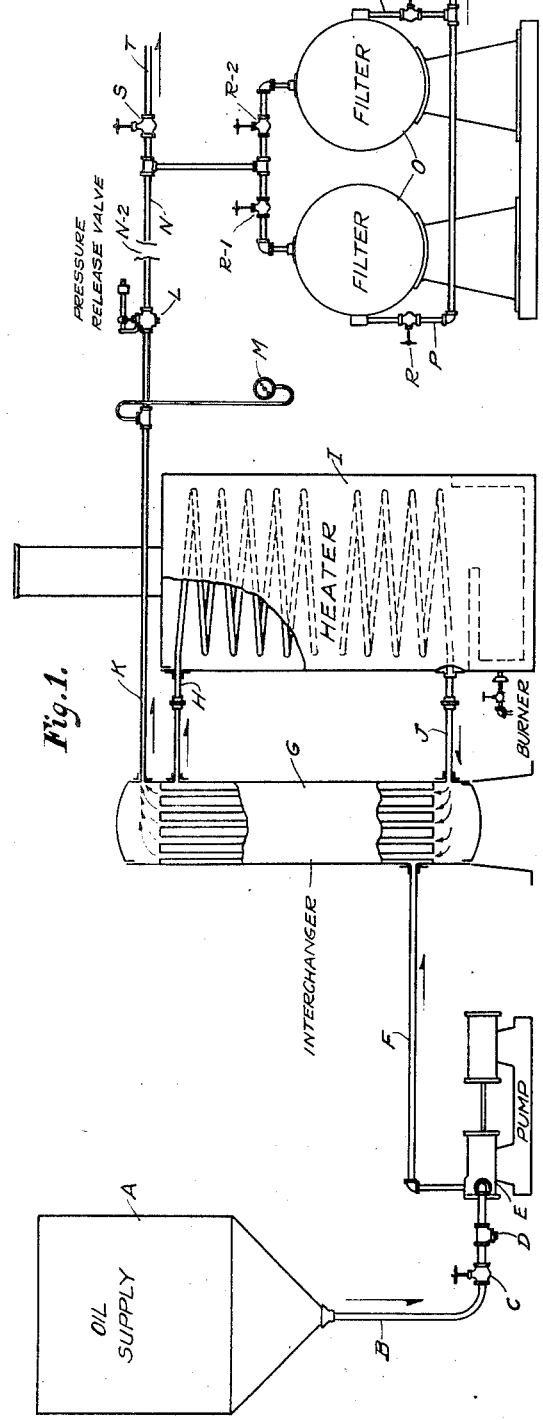

Dec. 27, 1927.

P. W. PRUTZMAN 1,653,735

METHOD OF DECOLORIZING OILS UNDER PRESSURE

Filed Dec. 6, 1926

INVENTOR

Paul W. Prutzman.

Patented Dec. 27, 1927.

1,653,735

UNITED STATES PATENT OFFICE.

PAUL W. PRUTZMAN, OF LOS ANGELES, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE.

METHOD OF DECOLORIZING OILS UNDER PRESSURE.

Application filed December 6, 1926. Serial No. 152,923.

In decolorizing, deacidifying and purifying mineral lubricating oils, it has been customary to treat them with various powdered adsorbent materials, the treatment consisting in an intermixture of the adsorbent with the oil and the heating of the mixture for the purpose of rendering the adsorbent more active and efficient. It has been customary to conduct this heating under atmospheric pressure and at the end of or shortly after the heating step to filter from the oil the solid adsorbent, together with the coloring matter and other impurities which such adsorbent has withdrawn from the oil.

The adsorbent materials used for this purpose are quite various in their nature and include fullers' earth and various types of clay, some varieties of light and porous magnesium silicate, animal and vegetable chars, diatomaceous earth, with and without a coating of carbon, certain clays or clay-like materials which have been treated with acid, and in general such solid materials as may be reduced to a fine powder for intermixture with the oil and which when so intermixed show the property of withdrawing coloring matter or other undesirable impurities from the oil.

Almost all of these bodies show a decided increase in decolorizing and purifying value when the temperature at which they are applied is raised above normal temperature, and with most of them this increase in decolorizing and purifying value increases progressively as the temperature increases, up to and even beyond the boiling point of the oil. It has therefore been common practice to apply these adsorbent materials to the oil at the highest temperature consistent with maintaining the desired physical characteristics of the oil being treated.

The maintenance of these physical characteristicts has been the limitation to the use of high temperature. All mineral oils, which are usually very complicated mixtures of various hydrocarbons, have some temperature at which they commence to give off vapor at atmospheric pressure, and if any material quantity of such vapor is allowed to be given off, this vaporization not only converts a portion of the oil into a distillate which is less valuable, and which in any case is not the desired object of the operation, but also undesirably changes the flash test, the viscosity, and other physical properties of the portion which remains. This production of vapor will be accelerated if either the oil or clay contains any water, which on heating is converted into steam, or if, as is usually the case, steam is blown into the oil while in the heated condition for the purpose of removing volatile impurities produced by the slight decomposition which often accompanies the heating of oil in contact with an adsorbent.

It is the object of my invention to prevent the evolution of vapors from the mixture of oil and adsorbent during the period of heating, and thus to enable the adsorbent to be applied to the oil at a much higher temperature than has heretofore been possible to apply in practice. By thus increasing the working temperature a much greater efficiency or decolorizing and purifying value is obtained from unit quantity of the adsorbent, or to reverse the expression, to obtain a unit decolorization, for instance, of the oil it is possible to use a much smaller quantity of the adsorbent material. This not only effects a direct economy in the consumption of adsorbent, which is often quite expensive, but it also effects a corresponding saving in the amount of oil adsorbed and entrained in the spent adsorbent as finally separated in the form of a filter cake. It also effects a corresponding reduction in the capacity of the filters required, and has many other advantages which will be apparent to those skilled in the art.

The extent to which economies of adsorbent may be effected in this manner may not be generally known. It varies, of course, with the nature of the oil and the nature of adsorbent, but in the typical instance of a Mid-continent cylinder stock treated with a well known and widely used decolorizing clay, the decolorizing power of the clay at a temperature of 200° F. or below is practically nil. At 250° it may be given the arbitrary value of 1.0. At 450° the relative decolorizing power would be as 2.5, at 600° as 4.5, and at 800° as 7.0. In other words, to effect unit decolorization the quantity of clay required at a temperature of 250° F. would be 7 times the quantity required to effect the same degree of decolorization at 800° F.

A further advantage attending the use of my invention lies in the fact that it makes possible the application of decolorizing agents at efficient temperatures to oils which have heretofore been considered too volatile to be treated with such materials. The lighter lubricating oils, for instance, flash at so low a temperature that they can not be heated above 350° at the most, and in some cases no higher than 250° F., and at such temperatures the efficiency of decolorizing clays is usually so low that only a slight cut in color will be effected by any commercially feasible dose of clay, and the operator is therefore forced to the use of acid treatment and other methods which are effected at low temperatures to obtain the desired degree of decolorization. By the use of my invention such oils, and even oils so volatile as kerosene and gasoline, regardless of their flash test or boiling point, may be treated at any temperature up to that at which the oil totally decomposes.

In the actual carrying out of my invention it is necessary to mix the oil with the adsorbent either before or after heating, the adsorbent being either completely dry, or partially dry and in a powdered form, or saturated with water in the form of a fluid mud, or suspended in or emulsified with a portion of the oil to be treated. The mixture must then be heated to the desired temperature, which temperature is above the vaporization point of the particular oil being treated. The mixture must then be cooled to or below the vaporization point. After cooling to this temperature, which must be done before the pressure is released, the oil should be cooled to a temperature at which it is permissible to expose the oil to contact with the atmosphere, but this second cooling may take place either before or after the pressure is released, and either before or after the adsorbent and the impurities contained therein are filtered from the oil. It is often desirable to blow steam or other non-oxidized gas or vapor through the oil after it is cooled below the vaporization point, for the purpose of removing certain small quantities of volatile bodies produced by a slight decomposition of the oil caused by heating it in contact with the adsorbent. This steaming or similar treatment must be applied after the pressure is released, but after such release it may be applied either before or after a further cooling is effected, and before or after the adsorbent is filtered out of the oil.

The term "vaporization point" is used repeatedly in the course of this specification and in the accompanying claims, for the purpose of avoiding the repetition of a long and involved phrase, and is recognized to be vague and indefinite unless given an exact definition. It will therefore be understood that as here used these words are intended to mean—the closed-cup flash point of an oil to be treated, as determined by the Pensky-Martin tester described and by the procedure directed in Bureau of Mines Technical Paper 323–A entitled "Petroleum products, and methods for testing", pages 52 to 57 inclusive. Where the term "vaporization point" is used in reference to an oil which has already been treated, it will be understood that the term refers back to the characteristics of the oil prior to the treatment with adsorbent, it being recognized that such treatment with adsorbent at elevated temperatures produces volatile decomposition products which were not present in the original oil.

In heating oil with an adsorbent solid, the temperature of the oil is above normal for the time required to raise it to the maximum temperature desired, plus the time required for the reaction of the adsorbent at that temperature, plus whatever time intervenes between the completion of the decolorizing reaction and the voluntary or involuntary cooling of the oil, whichever may be practiced. The time period during which the oil is close to the maximum temperature may range from a few minutes to an hour or more.

If the oil be heated for a sufficient length of time to a temperature close to its boiling point, sufficient vapor will be evolved to materially alter the characteristics of the remaining oil. Just what degree of change would constitute a material alteration would depend on the nature of the oil and on the degree of proximation which the operator considers permissible as to flash tests and viscosities. For instance, an increase in flash test of 4° or 5° would usually be considered a desirable change, but if in sweating off the lighter elements in the oil, this increase in flash were accompanied by a change of say five seconds in viscosity, most refiners would reject the product as not being sufficiently close to the standard fixed for the particular oil under treatment.

The purpose of my invention is to permit the application of adsorbent decolorizing and purifying agents to oils at materially higher temperatures than can be used for this purpose in the present state of the art, and it is contemplated that the higher temperatures used under my invention will be such that if the oil were heated to such temperatures in the open air or in a substantially closed vessel having a free outlet for vapor, at least several percent of the volume of the oil distil over and be converted into a less valuable product, with a corresponding change in the characteristics of the residue. It is possible, and in many cases desirable, to apply in the carrying out of my invention a temperature which, under atmospheric pressure and with a current of steam passing through the oil, would cause practically the entire quantity of oil to distil over, thus producing a complete change in the characteristics of the material.

While reference is repeatedly made to cracking of the oil, it should be understood that my invention is not in any sense a cracking process, nor is it suited for the production of pyrogenetic napthas. The small amount of cracking which takes place is due solely to the addition of the adsorbent, which ceases to function as a catalyst when its activity as an adsorbent is expended, and consequently the quantity of cracked product which is made by the heating of oil with adsorbent under pressure is relatively quite small. If the temperature is carried to such point that the heat and pressure produces a serious decomposition of the oil, with the production of cracked naptha and free carbon, the upper limit of temperature which my invention contemplates has been passed, and the object to be gained by the use of my invention, to-wit, an increase in the efficiency of the adsorbent for decolorizing and purifying the oil, will not be attained.

The pressure necessary to prevent the evolution of vapor may be created in several ways, of which at least two are commercially feasible. The oil may be inclosed with the intermixed adsorbent in a sealed vessel in which the pressure required to restrain evolution of vapor is produced by the evolution of steam from water contained in the adsorbent, or from water added to the oil for that purpose, or even by means of the vapor pressure of the oil itself, if the retaining vessel be substantially filled. Or, a flow stream of the oil and intermixed adsorbent may be delivered to a continuous heating means such as a heated coil, the pressure being raised by the pump or other feeding means, and maintained by releasing, through a valve or other control means, a quantity of the mixture equal to that delivered by the feeding means.

The heating of an oil to a high temperature consumes considerable quantities of heat, which may be economized by passing the hot oil delivered from the continous heating means into one side of a heat interchanger, through the other side of which is fed the cold oil, alone or in admixture with the adsorbent, for the transfer to the cold oil of a portion of the sensible heat of the hot oil.

Figure 2:
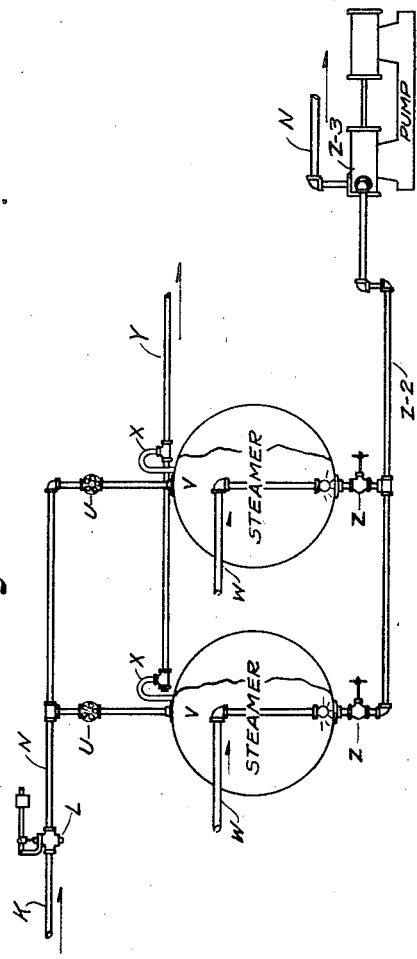

The object of my invention and one manner of giving it practical application may be best appreciated from the following description of an illustrative embodiment thereof, taken in connection with the appended claims and the accompanying drawing in which Fig. 1 is a diagrammatic elevational view showing one advantageous general arrangement of apparatus suitable for use in the practice of my invention, parts being broken away. This figure is provided with legends and other features adapting it to serve incidentally as a flow sheet. Fig. 2 is a similar view of an apparatus for steaming out volatile decomposition products, which may if desired be interposed in the flow shown in Fig. 1.

In Fig. 1, A is a tank adapted to hold a supply of the oil to be treated. This tank may be open, if the oil is not volatile at atmospheric temperatures, but should be substantially closed if the oil to be treated is of the nature of gasoline and volatile on exposure to the air. The adsorbent, if in a powdered form, may advantageously be intermixed with the oil to be treated in the tank A. The means of introducing this adsorbent are not shown, but the powder may be dumped into the tank from sacks, or it may be lifted over the top by means of an elevator, or it may be drawn from a more elevated bin or tank, as may be convenient. Any one of the well known means for intermixing powdered solids with liquids may be used for mixing the adsorbent with the oil, such for instance, as preferably a mechanical agitator of the propeller type, situated close to the bottom of the tank, or a blast of air directed into the point of the cone. Mixing by air is not desirable, because of the entrainment of air by the oil, which is liable to cause oxidation of the oil when the latter is heated in the subsequent stage in the operation.

The mixture of oil and adsorbent, which must be maintained by continuous action of the mixing means, is drawn from tank A through the supply pipe B, which may be controlled, or shut off when the apparatus is idle, by means of the valve C. It is sometimes considered more desirable to introduce the adsorbent continuously, maintaining a supply of oil free from adsorbent in the tank A. In such case a stream of an aqueous adsorbent mud, or a stream of such mud emulsified with a part of the oil to be treated, or a stream of such oil previously intermixed with adsorbent to a fluid condition, may be introduced in measured quantities into the opening D, by means of a pump or other suitable injecting means.

The supply of mixed oil and adsorbent enters the suction of the pump E, which may be of any type desired but which must be capable of raising the required pressure on the stream delivered to the heater. This stream flows from the discharge side of the pump through the delivery pipe F to one side of the interchanger G, which interchanger may consist of a battery of tubes fixed inside a cylindrical shell in such manner that the liquid flowing through the shell and outside of the tubes can not intermix with the liquid flowing from end to end inside the tubes. From this interchanger the oil passes through the hot oil pipe H into the heater I. This heater may consist of a brick-work setting comprising a combustion chamber, provided with an oil burner or other means of producing hot fire gases, and a chamber in which is placed a coil of pipe for the heating of the oil flowing therethrough; or it may be any of the well known means for continuously heating a flow-stream of oil under pressure. In the heater I the oil is raised to the desired temperature, and flows from such heater through the discharge pipe J into that side of the interchanger G opposite to the side through which the stream of cold oil is passing. In such interchanger the temperature of the stream of heated oil is reduced while the temperature of the stream of cold oil is raised by an exchange of heat through the walls of the tubes of which the interchanger is composed. The partially cooled oil leaving the interchanger through the pipe K passes through an adjustable automatic pressure release valve, indicated at L, by means of which the pressure of the oil contained in that part of the system between the pump E and the valve L is maintained at such height as to prevent the evolution of vapor from the heated oil. This pressure may be read for its control by means of the pressure gauge indicated at M.

It is obvious, that if desired, the stream flowing through the pipe J may be diverted directly into the pipe K, and the interchanger cooled by means of a flow of water or other cooling liquid in the usual manner, the purpose of the use of an interchanger in place of a cooler being merely to conserve heat.

It is impossible to state in figures the pressures and the temperatures which should be carried on the oil between the pump E and the release valve L, as they may be varied within considerable limits. The temperature, however, must always be above the vaporization point of the oil being treated, and to secure maximum efficiency should be as much higher as the stability of the oil will permit—not so high as to cause serious cracking and the production of free carbon. The pressure must be sufficient to prevent evolution of vapor at such temperature. First stage cooling, prior to release of pressure, must be to a temperature below the vaporization point, but preferably only a little below, so that the sensible heat remaining in the oil may be utilized in removing any cracked products volatile below the vaporization point.

The pressure release valve L, which may be an adjustable automatic valve as indicated, or may be a hand operated valve, releases the pressure either to atmospheric pressure or to the pressure required for the operation of the filters indicated at O. The oil ofter leaving the release valve and being there reduced in pressure, flows through the release pipe N into the filters, where the adsorbent and other solid constituents of the mixture are removed and retained, the clarified oil flowing out of the filters through the pipes P and Q. By the latter it is conveyed into a tank or other suitable place of storage, passing if desired through a second cooling means, not shown, by which the temperature of such oil is reduced to that at which it is safe to expose the oil to contact with the air. The valves R in the lines N and P are for the purpose of using the presses alternately and thus maintaining a steady flow of oil through the heaters, one pair of valves being closed while the corresponding press is being cleaned, the opposite pair of valves at such time being open and the press in use. In case both presses should be shut down at one time, by reason of accident or other cause, the two upper valves $R^1$ and $R^2$ may be closed and the waste-valve S opened, the oil then flowing temporarily through the waste-pipe T into a suitable receptacle from which it may, when convenient, be pumped back into the filters O.

The filters indicated are of the drum type, but any other type of filter, such as the well known plate and frame press, or any other of the well known mechanical means for separating solids from liquids may be used to replace the presses shown, the particular method or separating the solid from the liquid being no part of my invention.

In Fig. 2, K is the pipe conveying partially cooled oil as shown in Fig. 1, and L is the automatic pressure release valve, also shown in Fig. 1. N is the pipe shown in Fig. 1 conveying oil at reduced pressure or atmospheric pressure, and the entire apparatus shown in Fig. 2 may be interposed in the system shown in Fig. 1, at the point indicated by the letter $N^2$ in such figure. In other words, it is interposed between the pressure release valve and the filters or other means for separating the solid from the liquid.

The pipe N divides into two branches controlled by the valves U which open into the steamers V, these steamers being substantially closed vessels of any suitable size, each being provided with the steam inlet pipe W, which pipe terminates in perforated branch pipes extending along the bottom of the steamer, or in any other suitable means for distributing steam beneath the surface of the oil contained in the steamer.

In operation, one of these steamers is filled with oil, and the stream from the heater through the pipe N is then diverted to the other steamer. While the second steamer is being filled, the first, which is already filled with oil to a suitable level, say three quarters of its height, is agitated by means of steam from a boiler or other source of supply, not shown, entering through the pipe W. This steam, and the vapors of decomposition products which it would cause to be evolved from the hot oil, pass out through the riser pipe X into the vapor line Y, and thence to the open air or to a condensing means, not shown. The steaming of the mixture of oil and adsorbent in this vessel is continued until no further vapor is evolved, or until the vapor coming from the vapor pipe, or the condensate flowing from the condenser, as the case might be, is of sweet and unobjectionable ordor, showing that all decomposition products have been removed from the oil. The sweetened oil is then drawn from the steamer through the valve Z through the line Z² into the suction of the pump Z³, and discharged by such pump into the line N, (as shown in Fig. 1) by which it is carried under pressure to the filters O, and by these filters separated into a solid and a clear liquid portion. The remainder of the operation is as described for the operation of the apparatus shown in Fig. 1.

It will be understood that the use of steaming apparatus for sweetening the oil after the pressure thereon is released is entirely optional and is not a part of my invention, and that sweetening of the oil, if required, may equally well be accomplished by steaming it after it leaves the filters O, or it may be accomplished without steaming by passing the oil through a vessel on which a partial vacuum is maintained and the vapors of decomposition products withdrawn from the oil by the lowering of the pressure thereon. I show the steaming of the partially cooled oil simply as a feasible and desirable means of obtaining a sweet and salable product, and do not intend thereby to limit my invention to the use of this particular sweetening step, or to any sweetening step whatever, my invention residing solely in the step of heating the mixture of oil and adsorbent under pressure to a temperature higher than could be used without such application of pressure.

The process herein described may be applied to oils of any character, though it is recognized that it may be used to more advantage on mineral oils than on fatty oils or waxes, which are likely to have their taste and odor (if intended for sale as edible oils) degraded by heating to the high temperatures contemplated. It may with advantage be applied to fatty oils, waxes and resins which are not decomposed by such temperatures, and to all kinds and classes of mineral oils, from gasoline to the heaviest lubricating oils. It may be applied to mineral or other oils in their raw or crude condition, or after treatment with acid and removal of the acid reaction products by washing or otherwise, or to acid treated oils while still in the acid condition. In the latter case the adsorbent exercises at once a decolorizing and a neutralizing effect, both of which are accelerated and promoted by the high temperatures used herein.

While I have shown and described feasible and practical means for applying my invention to the treatment of oils, I would have it understood that the means for storing the oil and intermixing the adsorbent therewith; and for heating the oil under pressure; and for cooling the oil to a lower temperature; and for releasing the pressure; and for filtering the solid from the liquid, are not my invention. Nor do I claim any particular means for carrying out these steps, nor do I claim any particular temperature or range of temperatures to which the oil is to be heated, nor any particular pressure or range of pressures at which the heating is to be conducted, nor any particular adsorbent material for the decolorization and purification of the oil. What I have invented and wish to claim, as broadly as the state of the art will permit, is the application of adsorbent decolorizing and purifying agents to oils at temperatures at which, under atmospheric pressure, they would give off an appreciable or material quantity of vapor, and the maintenance of a sufficient pressure on such oil during the period of heating to such temperature to prevent the evolution of vapors therefrom.

I claim as my invention:

1. The method of decolorizing and purifying oils with adsorbents which comprises: heating a mixture consisting solely of an oil to be decolorized and an adsorbent to a temperature above the vaporization point of the oil, and preventing the evolution of oil vapor therefrom by the application thereto of pressure in excess of the pressure which may result from frictional resistance to movement of the oil.

2. The method of purifying and decolorizing oils with adsorbents which comprises: heating a mixture consisting solely of an oil to be decolorized and an adsorbent to a temperature above the vaporization point of the oil and coincidently applying pressure to prevent the evolution of oil vapors, cooling the oil below its vaporization point, and releasing the pressure.

3. The continuous method of purifying and decolorizing oils with adsorbents which comprises: continuously heating a confined flow-stream composed solely of an oil to be decolorized and an adsorbent to a temperature above the vaporization point of the oil while applying pressure to the stream to prevent the evolution of oil vapor, continuously cooling such stream below the vaporization point of the oil, and continuously reducing the pressure on such stream after such cooling.

4. An apparatus for decolorizing and purifying oils by the action of adsorbents under pressure, comprising in combination: a substantially closed vessel, means for filling such vessel with a mixture of oil and adsorbent, means for heating the contents of such vessel above the vaporization point of the oil, means for applying pressure to such mixture while so heated, means for cooling the mixture below the vaporization point of the oil, means for releasing the pressure after such cooling and means for mechanically separating the adsorbent from the cooled oil.

5. An apparatus for continuously decolorizing and purifying oils by the action of adsorbents under pressure, comprising in combination; means for producing a flow-stream of a mixture of oil and adsorbent, means for heating said stream above the vaporization point of the oil, means for confining such stream and for creating a pressure thereon, means for cooling such stream below the vaporization point of the oil, means for releasing the pressure after such cooling and means for mechanically separating the adsorbent from the cooled oil.

In witness that I claim the foregoing I have hereunto subscribed my name this eighteenth day of November, 1926.

PAUL W. PRUTZMAN.